UNITED STATES PATENT OFFICE.

HARRY I. BLITS, OF PHILADELPHIA, PENNSYLVANIA.

PROCESS OF PRESERVING FRUITS, &c.

SPECIFICATION forming part of Letters Patent No. 378,999, dated March 6, 1888.

Application filed February 9, 1887. Serial No. 227,062. (No specimens.)

*To all whom it may concern:*

Be it known that I, HARRY I. BLITS, of Philadelphia, in the county of Philadelphia and State of Pennsylvania, have invented certain new and useful Improvements in Processes of Preserving Fruits and Vegetables; and I do hereby declare the following to be a full, clear, and exact description of the invention, such as will enable others skilled in the art to which it appertains to make and use the same.

My invention relates to an improved process on the method of preserving fruits, vegetables, &c., by a combination of sirups and hot dry air, whereby chemicals and antiseptics are dispensed with, and the necessity of cooking, stewing, or steaming fruits in vessels of water is dispensed with.

The following description will enable the process to be fully understood.

The proportions for making sirups are as follows: For each quart fruit-jar place in a separate vessel one pint and a quarter of water, a half-pound of sugar, and one-eighth pound of honey. If a soft fruit is employed—such as strawberries, raspberries, &c.—mix the one-half pound of sugar in layers with each pound of berries used in a vessel, allowing the same to stand over night, or from morning until evening, in a cool place, thereby forming their own juice, and in this latter case the water is dispensed with. The juice is then nearly all drained off from fruits and the one-eighth pound of honey is added. The sirup is then boiled down one-third. In the meantime the fruit-jars are rinsed inside and out with hot water to temper them. The fruits are then packed tightly within the jars by means of a non-corrosive metal and the jars placed in a warm oven on slides or other devices, whereby they will not come in contact with the bottom of the oven, thereby preventing breakage. If preferred, the jars may be placed on the top of a stove or range and covered by an inverted boiler or other vessel, in order to retain the hot dry air rising from the stove or range. When the sirup has boiled down one-third, the jars should be filled, one at a time, with this sirup, which, being poured while hot over the fruit, drives out the air and kills the animalculæ therein.

This combination of sirup made as described from the sugar and honey is boiled down one-third, which is very important, because if the sirup were only allowed to come to a boil it would not have sufficient preservative power to keep the fruit.

This sirup, made as described, keeps the fruit whole and more natural in taste and flavor, and takes one-half the time and labor otherwise required, as the fruit need not be stewed or steamed.

The idea of placing the jars after they are filled with fruit in a hot oven or on top of a stove or range, as described, is for the purpose of keeping the fruit and jars warm, so that when the hot sirup is poured in the jars they will not be liable to break.

Having fully described my invention, what I claim as new, and desire to secure by Letters Patent, is—

The herein-described process of preserving fruits, consisting in first arranging fruit and sugar in alternate layers and allowing the same to stand for a time; secondly, drawing the sweetened juice from the fruit, exposing the latter to a dry heat in jars, and subsequently pouring the previously prepared and heated sirup on the fruit in the heated jars.

In testimony whereof I have signed this specification in the presence of two subscribing witnesses.

HARRY I. BLITS.

Witnesses:
   C. V. KELLOGG,
   E. M. WELLS.